(12) United States Patent
Nagakura et al.

(10) Patent No.: US 10,190,189 B2
(45) Date of Patent: Jan. 29, 2019

(54) SCANDIUM RECOVERY PROCESS

(71) Applicant: SUMITOMO METAL MINING CO., LTD., Tokyo (JP)

(72) Inventors: Toshihiko Nagakura, Niihama (JP);
Yoshitomo Ozaki, Niihama (JP);
Hidemasa Nagai, Niihama (JP);
Tatsuya Higaki, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 211 days.

(21) Appl. No.: 15/118,250

(22) PCT Filed: Feb. 18, 2015

(86) PCT No.: PCT/JP2015/054434
§ 371 (c)(1),
(2) Date: Aug. 11, 2016

(87) PCT Pub. No.: WO2015/125821
PCT Pub. Date: Aug. 27, 2015

(65) Prior Publication Data
US 2017/0175225 A1    Jun. 22, 2017

(30) Foreign Application Priority Data
Feb. 19, 2014 (JP) .................. 2014-029537

(51) Int. Cl.
*C22B 59/00* (2006.01)
*C22B 7/00* (2006.01)
*C22B 3/06* (2006.01)

(52) U.S. Cl.
CPC ............ *C22B 7/006* (2013.01); *C22B 3/06* (2013.01); *C22B 7/00* (2013.01); *C22B 59/00* (2013.01); *Y02P 10/234* (2015.11)

(58) Field of Classification Search
CPC ................ C22B 59/00; C22B 7/006
See application file for complete search history.

(56) References Cited

U.S. PATENT DOCUMENTS

| 4,624,703 A | 11/1986 | Vanderpool et al. |
| 4,718,995 A | 1/1988 | Vanderpool et al. |

(Continued)

FOREIGN PATENT DOCUMENTS

| CN | 102127641 A | * | 7/2011 |
| CN | 102863004 A | | 1/2013 |

(Continued)

OTHER PUBLICATIONS

Office Action dated Jul. 31, 2017, issued to CN Patent Application No. 201580008537.5.

(Continued)

*Primary Examiner* — Melissa S Swain
(74) *Attorney, Agent, or Firm* — Locke Lord LLP; James E. Armstrong, IV; Nicholas J. DiCeglie, Jr.

(57) ABSTRACT

The purpose of the present invention is to recover roughly purified scandium, which is purified to an extent acceptable for a technique for highly purifying scandium, efficiently and without any complicated operation from a neutralization sediment (drainage sediment) generated in neutralizing acid mine drainage which contains a sulfur component. This scandium recovery process includes a washing step (S1) for washing a neutralization sediment (drainage sediment) and a dissolution step (S2) for subjecting the washed sediment obtained in the washing step (S1) to dissolution in an acid. It is preferable that the process further includes a re-dissolution step (S3) for subjecting a dissolution residue which remains after the dissolution in the dissolution step (S2) to dissolution with an acid. In the washing step (S1), the neutralization sediment is washed with a washing liquid (Continued)

until the pH of the post-washing liquid generated in the washing step becomes 6 or higher.

6 Claims, 3 Drawing Sheets

(56) References Cited

U.S. PATENT DOCUMENTS

| | | | |
|---|---|---|---|
| 4,808,384 | A | 2/1989 | Vanderpool et al. |
| 4,816,233 | A | 3/1989 | Rourke et al. |
| 4,988,487 | A | 1/1991 | Lai et al. |
| 2015/0184268 | A1 | 7/2015 | Asano |

FOREIGN PATENT DOCUMENTS

| | | |
|---|---|---|
| CN | 103526057 A | 1/2014 |
| EP | 0306980 A1 | 3/1989 |
| EP | 0775753 A1 | 5/1997 |
| JP | H01133920 A | 5/1989 |
| JP | H03173725 A | 7/1991 |
| JP | H09-176756 A | 7/1997 |
| JP | H09194211 A | 7/1997 |
| JP | H09-208222 A | 8/1997 |
| JP | H-09-291320 A | 11/1997 |
| JP | 2014-001430 A | 1/2014 |

OTHER PUBLICATIONS

Database WPI Week 201326 Thomson Scientific, London, GB; AN 2013-D89767 XP002765403. (cited in the Jan. 20, 2017 EP Search Report).
Extended European Search Report dated Jan. 20, 2017, issue for European Patent Application No. 15752032.1.
International Search Report dated Apr. 14, 2015, issued for PCT/JP2015/054434.
Office Action dated Aug. 5, 2016, issued for Australian Patent Application No. 2015219899.

* cited by examiner

SCANDIUM RECOVERY PROCESS

TECHNICAL FIELD

The present invention relates to a method of recovering scandium. More specifically, the present invention relates to a method of recovering, as a resource, scandium hydroxide, scandium oxide and/or scandium carbonate contained in a neutralized sediment which is generated when an acidic mine wastewater containing sulfur components is neutralized.

BACKGROUND ART

Scandium is extremely valuable as an additive for high-strength alloys and an electrode material for fuel cells. However, scandium has not yet been widely used due to small production quantity and high cost thereof.

Meanwhile, a trace amount of scandium is contained in nickel oxide ore such as laterite ore and limonite ore. However, nickel oxide ore has not been industrially used as a raw material for nickel for many years because the content level of nickel in nickel oxide ore is low. Consequently, very few studies also have been conducted for industrially recovering scandium from nickel oxide ore.

However, in recent years, the High Pressure Acid Leaching (HPAL) process has been emerging for practical use, in which nickel oxide ore is introduced into a pressure vessel along with sulfuric acid, and heated at a high temperature of about 240 to 260° C. to allow solid-liquid separation into a nickel-containing leachate and a leach residue. A neutralizing agent is added to a leachate obtained from the HPAL process to separate impurties, and then a sulphidizing agent is added to recover nickel as nickel sulfide. Subsequently, this nickel sulfide is subjected to a known nickel refinement process to obtain electrolytic nickel and nickel salt compounds (see Patent Document 1).

FIG. 2 shows a flow chart for recovering metal from nickel oxide ore according to the publicly known technology. When the HPAL process is used (Steps S101 to S103 in FIG. 2), scandium contained in nickel oxide ore will be contained in a leachate along with nickel (Step S101 in FIG. 2). Subsequently, when a neutralizing agent is added to the leachate obtained from the HPAL process to give a pH of 1 or more to less than 4 to separate impurities (Step S102 in FIG. 2), and a sulphidizing agent is then added (Step S103), nickel is recovered as nickel sulfide while scandium remains in the post-sulfuration liquid after addition of the sulphidizing agent. Therefore, nickel and scandium can effectively be separated when the HPAL process is used.

Then, scandium contained in the post-sulfuration liquid can be separated from impurities such as manganese by allowing scandium to be adsorbed by a chelating resin having a functional group of iminodiacetate (Step S104 in FIG. 2). Further, it is also proposed to concentrate scandium after adsorbed by the chelating resin (Step S105 in FIG. 2). Technologies for allowing a chelating resin to adsorb scandium contained in a post-sulfuration liquid and for performing further concentration are disclosed in Patent Documents 2 to 4 and the like.

However, the scandium recovery steps as described in Steps S104 and S105 of FIG. 2 may not necessarily be provided in view of the content level, the available amount, the facility investment cost and the like. FIG. 3 shows a flow chart when the scandium recovery steps are not provided. The same symbols as in FIG. 2 are used for the HPAL process. The post-sulfuration liquid after addition of a sulphidizing agent (Step S103 in FIG. 3) is sent to a wastewater treatment step (Step S106 in FIG. 3) while maintaining a scandium content, where a neutralizing agent is added so as to obtain a pH of 4 or more to form a wastewater sediment containing scandium compounds as well as impurities such as manganese compounds. Subsequently the wastewater sediment will be disposed in landfill cites and the like. Scandium is a rare material. Therefore, there have been demands for developing a technology of recovering scandium from a wastewater sediment.

An approach for obtaining highly pure scandium oxide from scandium hydroxide or scandium carbonate has been proposed, the approach comprising: a dissolution step of dissolving scandium hydroxide or scandium carbonate in an acidic aqueous solution to obtain a scandium-containing solution; a liquid adjustment step of preparing a reduced liquid by use of a reducing agent; an adsorption step of allowing for a contact with a chelating resin to form a chelating resin having scandium adsorbed; a washing step of washing the chelating resin having scandium adsorbed with a dilute acid; a dissolution step of dissolving scandium from the chelating resin having scandium adsorbed with a strong acid to obtain a scandium-containing solution; a precipitation step of obtaining a scandium precipitate with a precipitant; and a calcining step of calcining the precipitate (see Patent Document 5).

Patent Document 1: Japanese Unexamined Patent Application, Publication No. H03-173725
Patent Document 2: Japanese Unexamined Patent Application, Publication No. H01-133920
Patent Document 3: Japanese Unexamined. Patent Application, Publication No. H09-176756
Patent Document 4: Japanese Unexamined Patent Application, Publication No. H09-194211
Patent Document 5: Japanese Unexamined Patent Application, Publication No. H09-208222

DISCLOSURE OF THE INVENTION

Problems to be Solved by the Invention

However, the content level of scandium in a wastewater sediment is as low as about 10 ppm. In addition, a wastewater sediment contains a large amount of impurities to be removed such as manganese, aluminum and the like. Therefore, when a wastewater sediment is directly subjected to the technology described in Patent Document 5, the purity of scandium in a leachate obtained through the dissolution and liquid adjustment steps is low, and sufficiently pure scandium oxide may not be recovered even after the aforementioned adsorption, washing and dissolution steps. A technology for recovering crudely purified scandium having a sufficient quality for the technologies of obtaining high purity scandium from a wastewater sediment such as those described in Patent Document 5 and the like is required.

An objective of the present invention to efficiently recover crudely purified scandium without performing complicated operations from a neutralized sediment (wastewater sediment) generated when an acidic mine wastewater containing sulfur components is neutralized, in which the crudely purified scandium is purified to the extent where it can be applied to technologies for obtaining high purity scandium.

Means for Solving the Problems

After conducting extensive studies to achieve the above objective, the present inventors found that scandium compounds fixed in a form of a neutralized sediment can efficiently be recovered as a resource by dissolving a post-washing sediment in an acid, the post-washing sediment being obtained after washing the neutralized sediment. The present invention has been completed. Specifically, the present invention provides the followings.

(1) The present invention provides a method of recovering scandium, the method comprising: a washing step of washing a mixture containing scandium hydroxide, scandium oxide and/or scandium carbonate and manganese hydroxide, manganese oxide and/or manganese carbonate; and a dissolution step of dissolving a post-washing sediment in an acid, the post washing sediment being obtained after washing in the washing step.

(2) Further, the present invention provides the method of recovering scandium according to (1), wherein the washing step comprises a step of washing the mixture with a washing liquid until the pH of a post-washing liquid obtained after washing in the washing step becomes 6 or more.

(3) Moreover, the present invention provides the method of recovering scandium according to (2), wherein the weight of the washing liquid is 3 times or more and 5 times or less relative to the weight of the mixture per washing.

(4) Furthermore, the present invention provides the method of recovering scandium according to any one of (1) to (3), wherein the mixture is a neutralized sediment generated when an acidic mine wastewater containing sulfur components is neutralized.

(5) Further, the present invention provides the method of recovering scandium according to any one of (1) to (4), wherein the dissolution step comprises a step of dissolving the post-washing sediment in the acid to adjust a pH to 1 or more and 4 or less.

(6) Moreover, the present invention provides the method of recovering scandium according to any one of (1) to (5), wherein the dissolution step comprises a step of dissolving the post-washing sediment in the acid so that a slurry concentration of the post-washing sediment is 10 wt % or more and 50 wt % or less.

(7) Furthermore, the present invention provides the method of recovering, scandium according to any one of (1) to (6), further comprising a re-dissolution step of dissolving a dissolution residue in an acid, the dissolution residue being obtained after dissolution in the dissolution step.

Effects of the Invention

According to the present invention, crudely purified scandium can efficiently be recovered without performing complicated operations from a neutralized sediment (wastewater sediment) generated when an acidic mine wastewater containing sulfur components is neutralized, in which the crudely purified scandium is purified to the extent where it can be used as a raw material for technologies of obtaining high purity scandium such as adsorption through a chelating resin, solvent extraction and the like.

PREFERRED MODE FOR CARRYING OUT THE INVENTION

Below, specific embodiments of the present invention will be described in detail, but the present invention shall not be limited to the following embodiments in any sense. Modifications may be made appropriately to the present invention without departing from the scope of the present invention.

Figure 1:
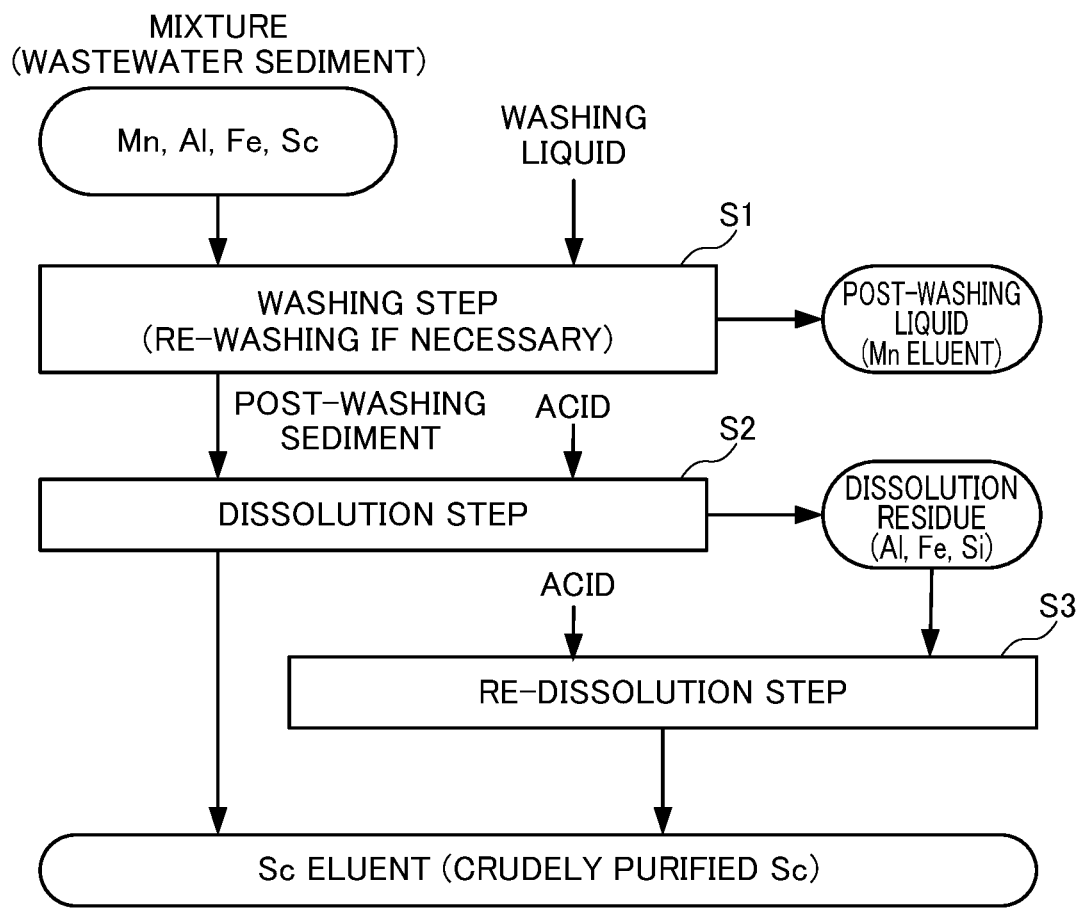
FIG. 1 describes the method of recovering scandium according to the present invention.
Figure 2:
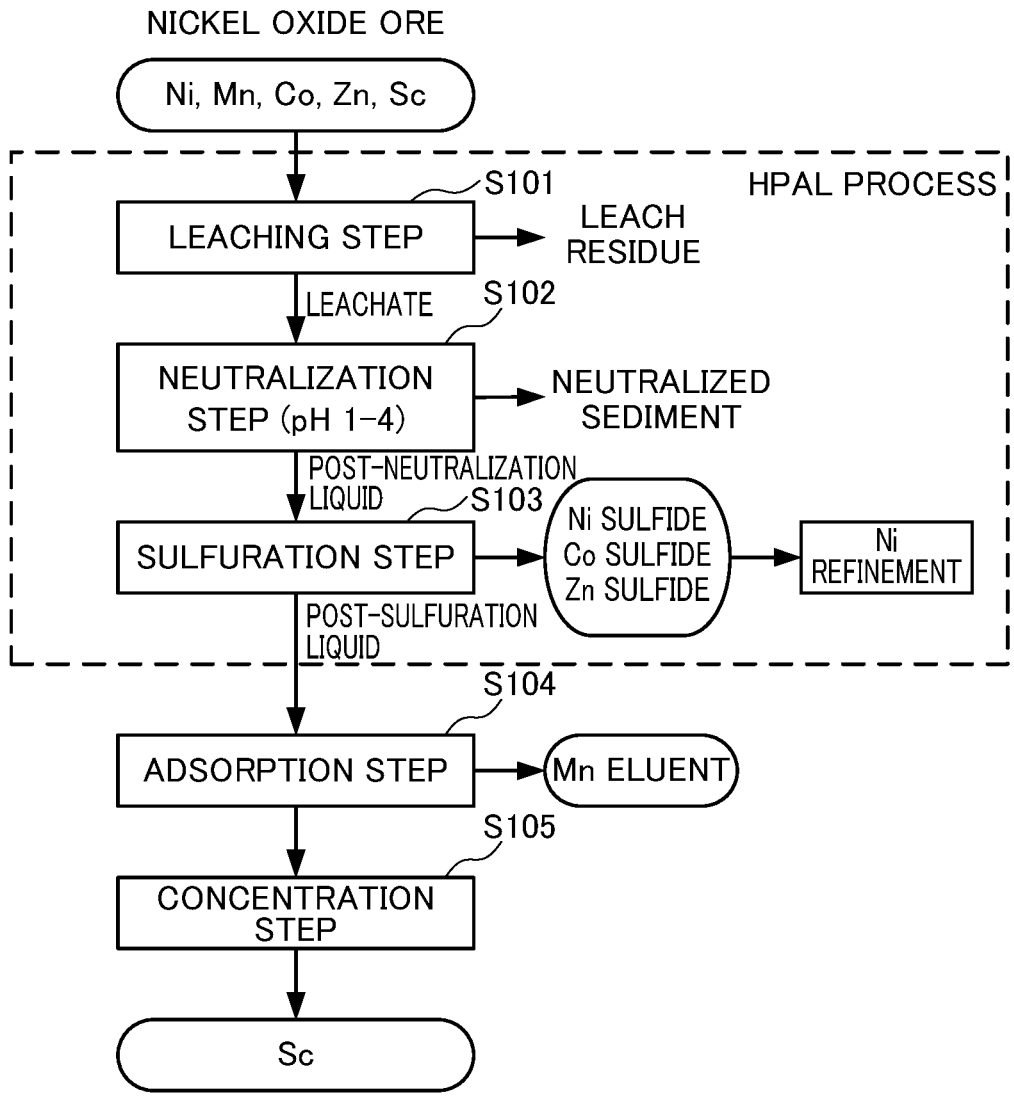
FIG. 2 illustrates a first conventional technology for recovering metal from ore.
Figure 3:
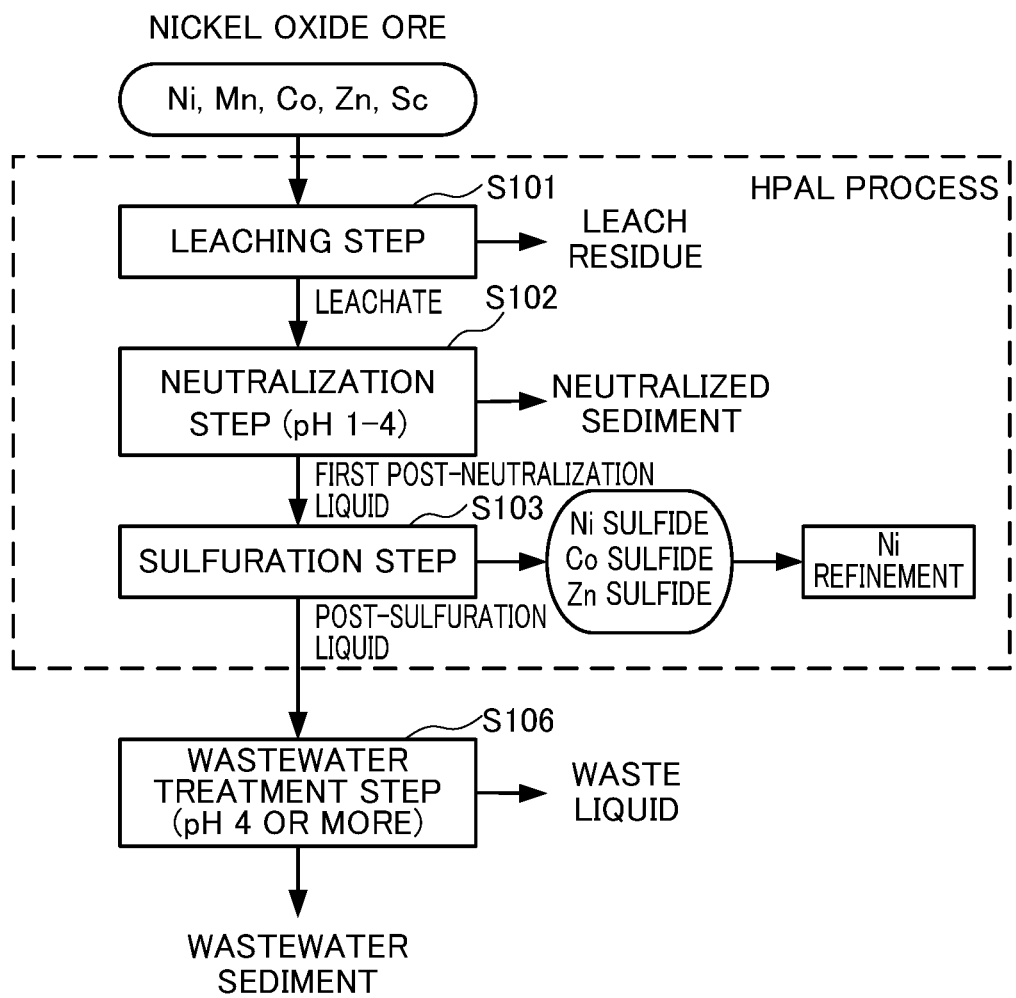
FIG. 3 illustrates a second conventional technology for recovering metal from ore.

FIG. 1 illustrates the method of recovering scandium according to the present invention. The present invention involves a washing step S1 of washing a mixture containing scandium hydroxide, scandium oxide and/or scandium carbonate and manganese hydroxide, manganese oxide and/or manganese carbonate; and a dissolution step S2 of dissolving a post-washing sediment in an acid, the post-washing sediment being obtained after washing in the washing step S1. Preferably, the present invention further involves a re-dissolution step S3 of dissolving a dissolution residue in an acid, the dissolution residue being obtained after dissolution in the dissolution step S2 although it is not essential.

<Washing Step S1>

In the washing step S1, a mixture containing scandium hydroxide, scandium oxide and/or scandium carbonate and manganese hydroxide, manganese oxide and/or manganese carbonate is washed. Below, a case where the mixture is a neutralized sediment (wastewater sediment) generated when an acidic mine wastewater containing sulfur components is neutralized will be described. However, the mixture shall not be limited to this, and can be any entity as long as it contains scandium hydroxide, scandium oxide and/or scandium carbonate and manganese hydroxide, manganese oxide and/or manganese carbonate.

In the washing step S1, a washing liquid is added to a neutralized sediment (wastewater sediment) and stirred to effect solid-liquid separation into a post-washing liquid and a post-washing sediment. Manganese ions will be contained in the post-washing liquid, and scandium compounds will be contained in the post-washing sediment. As a result, manganese compounds can be removed appropriately from the neutralized sediment (wastewater sediment). There is no particular limitation for the washing liquid, but it is preferably water, recycled water from wastewater discharged after repeated neutralization or the like, and more preferably pure water in view of avoiding any environmental problem after discharge.

There is no particular limitation for the weight of a washing liquid in the washing step S1, but it is preferably 3 times or more and 5 times or less of the weight of a neutralized sediment (wastewater sediment) per washing. In a case where the amount of a washing liquid is too small, washing may be insufficient, and may need to be repeated for many times. In a case where the amount of a washing liquid is too large, an effect for reducing the number of washing may not justify the increase in the amount of the washing liquid as an equipment capacity, in particular a filtration equipment capacity increases.

The stirring time is generally about 30 minutes although it may also depend on an equipment size and structure. Stirring for longer than that would produce no further significant effect. Further, the stirring temperature is preferably about 60° C. because the stirring time may be reduced.

One possible criterion for determining whether finishing the washing step S1 or washing a post-washing sediment again may involve analyzing the composition of a post-washing sediment for a change in the content of manganese components. However, it is preferred to use an alternative criterion of measuring the pH of a post-washing liquid because the above approach is time consuming. For example, the mixture is preferably washed until the pH of a post-washing liquid becomes 6 or more, more preferably until the pH becomes 6.5 or more, and even more preferably until the pH becomes 7 or more.

In a case where a post-washing sediment is washed again, the same method and conditions as in the washing step S1 may be used for re-washing operations.

Performing wash in the washing step S1 can appropriately remove manganese components contained in a neutralized sediment (wastewater sediment) in the early stage. As a result, the amount of an acid to be used in the dissolution step S2 can be reduced.

<Dissolution Step S2>

In the dissolution step S2, the post-washing sediment obtained after washing in the washing step S1 is made into a slurry, and an acid is added to leach scandium contained in the post-washing sediment into an acidic solution, thereby obtaining a scandium solution and a dissolution residue.

The above acid may be any conventionally known acid. Examples include, for example, sulfuric acid, hydrochloric acid, nitric acid and the like. But the acid is preferably sulfuric acid in view of wastewater treatment and the like.

In the dissolution step S2, the pH is preferably adjusted to 1 or more and 4 or less, more preferably 2.5 or more and 3.5 or less. A pH of less than 1 is not preferred because impurities contained in a post-washing sediment such as aluminum and iron may be leached into a scandium solution, resulting in a decreased purity of scandium in the scandium solution. A pH of less than 1 is also not preferred in that silicon contained in a post-washing sediment may be leached into a scandium solution to gelatinize the scandium solution, resulting difficult solid-liquid separation into a scandium solution and a dissolution residue. On the other hand, a pH of more than 4 is not preferred because a dissolution ratio (an leaching ratio) of scandium into a scandium solution decreases.

In the dissolution step S2, a post-washing sediment is preferably dissolved in an acid so that a slurry concentration of the post-washing sediment is 10 wt % or more and 50 wt % or less. A post-washing sediment is more preferably dissolved in an acid so that a slurry concentration of the post-washing sediment is 20 wt % or more and 40 wt % or less. A post-washing sediment is even more preferably dissolved in an acid so that a slurry concentration of the post-washing sediment is 25 wt % or more and 35 wt % or less. A slurry concentration of less than 10 wt % is not preferred because the concentration of scandium in the resulting scandium solution is decreased, which may affect the final scandium recovery rate and the equipment capacity when the scandium solution is purified by means of adsorption through a resin, solvent extraction and the like. Further, a slurry concentration of more than 50 wt % is not preferred because handling of the slurry is difficult.

<Re-Dissolution Step S3>

The re-dissolution step S3 is a step in which an acid is added to the dissolution residue obtained from the dissolution step S2 to generate a slurry again for the purpose of increasing the recovery rate of scandium components contained in the neutralized sediment. (wastewater sediment), and an acid is then added to the slurry to allow for nearly complete recovery of scandium remaining in the leach residue.

The same operations as in the dissolution step S2 may be used in the re-dissolution step S3. Note that in a case where the content level of scandium in the dissolution residue is low, a dissolution residue obtained from the dissolution step S2 and a post-washing sediment obtained from the washing step S may be combined for generate a slurry, thereby performing the dissolution step S2 and the re-dissolution step S3 concomitantly.

A scandium solution as crudely purified scandium obtained through the aforementioned steps can be used as a raw material for use in technologies of obtaining high purity scandium such those described in Patent Document 5 and the like.

EXAMPLES

Below, the present invention will be described in more detail with reference to Examples, but the present invention shall not be limited to these description in any sense.

<Preparation Process of Raw Materials>

First, nickel oxide ore was introduced into an autoclave along with concentrated sulfuric acid, and a slurry containing valuable metals such as scandium and nickel was generated under a condition of 245° C. over 1 hour. The slurry was then subjected to solid-liquid separation into a leachate comprising various valuable metals and a leach residue.

Subsequently, calcium carbonate was added to the leachate to adjust a pH to 3, thereby obtaining a neutralized sediment and a post-neutralization liquid. Valuable metals such as scandium and nickel are contained in the post-neutralization solution, and most of impurities such as aluminum are contained the neutralized sediment.

Subsequently, gaseous hydrogen sulfide was blown to the post-neutralization liquid to separate nickel, cobalt and zinc as sulfides from the post-sulfuration liquid.

Then calcium carbonate was added to the post-sulfuration liquid to adjust a pH to 9, thereby allowing separation into a wastewater sediment and a waste liquid. The composition of the wastewater sediment is shown in Table 1. This wastewater sediment was used as a raw material for Examples and Comparative Example.

TABLE 1

| Composition of wastewater sediment (Unit: wt %) | | | | | | | | | |
|---|---|---|---|---|---|---|---|---|---|
| Ni | Fe | Cr | Si | Al | Ca | Mg | Mn | Sc | Water content |
| 0.04 | 33.00 | 1.30 | 3.20 | 2.10 | 7.60 | 0.50 | 0.72 | 0.0009 | 27.35 |

EXAMPLES AND COMPARATIVE EXAMPLES

TABLE 2

|  | Washing | Re-washing |
|---|---|---|
| Example 1 | Yes | Yes |
| Example 2 | Yes | No |
| Comparative Example 1 | No | No |

Example 1

[Washing of Wastewater Sediment]

The above wastewater sediment was made into a 20 wt % slurry, and stirred at room temperature for 30 minutes, and solid-liquid separation into a post-washing liquid and a post-washing sediment was then performed using a nutsche and a filtering flask. Water was again added to the post-washing sediment, and re-washed by the same method as described above. The composition of the post-rewashing sediment after washing and re-washing is shown in Table 3.

TABLE 3

Composition of post-rewashing sediment (Unit: wt %)

| Ni | Fe | Cr | Si | Al | Ca | Mg | Mn | Sc |
|---|---|---|---|---|---|---|---|---|
| 0.04 | 33.00 | 1.30 | 3.20 | 2.10 | 7.50 | 0.49 | 0.07 | 0.0009 |

Table 3 clearly shows that about 90% of manganese components contained in the neutralized sediment was successfully removed by washing and re-washing.

[Dissolution of Post-Rewashing Sediment]

A solution of sulfuric acid was added to the post-rewashing sediment to adjust the slurry concentration and pH to 50 wt % and 3.5 respectively, and stirred at room temperature for 30 minutes to obtain a scandium solution and a dissolution residue. The above scandium solution was taken as a sample for Example 1.

Example 2

A scandium solution and a dissolution residue were obtained by the same approach as in Example 1 except that after performing solid-liquid separation into a post-washing liquid and a post-washing sediment, the post-washing sediment was directly dissolved in a solution of sulfuric acid without re-washing the post-washing sediment. The above scandium solution was taken as a sample for Example 2.

Comparative Example 1

A solution of sulfuric acid was added to the above wastewater sediment without washing to adjust the slurry concentration and pH to 50 wt % and 3.5, respectively, and stirred at room temperature for 30 minutes to obtain a scandium solution and a dissolution residue. The above scandium solution was taken as a sample for Comparative Example 1.

[Evaluation]

The concentration of each component contained in the samples from Examples and Comparative Example. Table 4 shows ratios of other components when the concentration of scandium is taken as 1.

TABLE 4

|  | Ni | Fe | Cr | Si | Al | Ca | Mg | Mn | Sc |
|---|---|---|---|---|---|---|---|---|---|
| Example 1 | 38 | 0 | 8 | 51 | 1698 | 104 | 906 | 95 | 1 |
| Example 2 | 38 | 0 | 8 | 51 | 1698 | 104 | 906 | 830 | 1 |
| Comparative Example 1 | 44 | 36667 | 1444 | 3556 | 2333 | 8444 | 556 | 800 | 1 |

Table 4 reveals that a scandium solution having purer scandium can be obtained through the washing step of washing a wastewater sediment and the dissolution step of dissolving a post-washing sediment in an acid, the post-washing sediment being obtained after washing in the washing step (Examples 1 and 2). In particular, it demonstrates that repeating the washing step for multiple times can further increase the purity of scandium (Example 2).

According to the present Examples, crudely purified scandium can efficiently be recovered without performing complicated operations from a neutralized sediment (wastewater sediment) generated when an acidic mine wastewater containing sulfur components is neutralized, in which the crudely purified scandium is purified to the extent where it can be used as a raw material for technologies of obtaining high purity scandium such as adsorption through a chelating resin, solvent extraction and the like.

In addition, manganese components are removed from a wastewater sediment in the washing step prior to the dissolution step. Therefore, in the subsequent dissolution step, the amount of sulfuric acid can be saved by the amount required to leach manganese as manganese sulfate in an amount corresponding manganese components removed in the washing step. Specifically, the amount of sulfuric acid can be saved by about 10% in the dissolution step as compared with a case where the washing step is not performed.

EXPLANATION OF REFERENCE NUMERALS

S1 Washing step
S2 Dissolution step
S3 Re-dissolution step

The invention claimed is:
1. A method of recovering scandium, comprising:
a washing step of washing a mixture containing scandium hydroxide, scandium oxide and/or scandium carbonate and manganese hydroxide, manganese oxide and/or manganese carbonate; and
a dissolution step of dissolving a post-washing sediment containing a scandium compound obtained after washing in the washing step in an acid to leach the scandium in the post-washing sediment into the acid solution, and thereby obtaining a scandium solution and a dissolution residue,
wherein the washing step comprises a step of washing the mixture with water until the pH of a post-washing liquid obtained after washing in the washing step becomes 6 or more.
2. The method of recovering scandium according to claim 1, wherein the weight of the washing liquid is 3 to 5 times relative to the weight of the mixture per washing.
3. The method of recovering scandium according to claim 1, wherein the mixture is a neutralized sediment generated when an acidic mine wastewater containing sulfur components is neutralized.
4. The method of recovering scandium according to claim 1, wherein the dissolution step comprises a step of dissolving the post-washing sediment in the acid to adjust a pH to 1 to 4.
5. The method of recovering scandium according to claim 1, wherein the dissolution step comprises a step of dissolving the post-washing sediment in the acid so that a slurry concentration of the post-washing sediment is 10 wt % to 50 wt %.
6. The method of recovering scandium according to claim 1, further comprising a re-dissolution step of dissolving a dissolution residue obtained after dissolution in the dissolution step in an acid.

* * * * *